(12) United States Patent
Hwang et al.

(10) Patent No.: US 11,455,305 B1
(45) Date of Patent: Sep. 27, 2022

(54) SELECTING ALTERNATE PORTIONS OF A QUERY PLAN FOR PROCESSING PARTIAL RESULTS GENERATED SEPARATE FROM A QUERY ENGINE

(71) Applicant: Amazon Technologies, Inc., Seattle, WA (US)

(72) Inventors: Sangyong Hwang, Sammamish, WA (US); Yongsik Yoon, Sammamish, WA (US); Kamal Kant Gupta, Snoqualmie, WA (US); Saileshwar Krishnamurthy, Palo Alto, WA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 16/457,122

(22) Filed: Jun. 28, 2019

(51) Int. Cl.
*G06F 16/00* (2019.01)
*G06F 16/2453* (2019.01)
(Continued)

(52) U.S. Cl.
CPC .... *G06F 16/24542* (2019.01); *G06F 16/2255* (2019.01); *G06F 16/2365* (2019.01); *G06F 16/248* (2019.01)

(58) Field of Classification Search
CPC .. G06F 12/0808; G06F 15/173; G06F 15/177; G06F 9/5055; G06F 9/5083; G06F 16/24539; G06F 16/24552; G06F 11/1662; G06F 11/2023; G06F 11/2041; G06F 11/2056; G06F 11/2069; G06F 11/3438; G06F 11/3447; G06F 11/3495; G06F 16/21; G06F 16/2228; G06F 16/2393; G06F 16/24549; G06F 16/635; G06F 16/68; G06F 16/95; G06F 16/9577; G06F 16/958; G06F 2201/86; G06F 2201/87; G06F 2201/88; G06F 9/505; G06F 16/2365; G06F 16/128; G06F 16/217; G06F 16/24542; G06F 2201/84; G06F 16/113; G06F 16/1858; G06F 16/245; G06F 16/43; G06F 11/1448; G06F 16/188; G06F 16/2455; G06F 16/27

See application file for complete search history.

(56) References Cited

U.S. PATENT DOCUMENTS 5,511,190 A 4/1996 Sharma et al.
7,657,516 B2 2/2010 Zaman et al.
(Continued)

OTHER PUBLICATIONS

U.S. Appl. No. 15/918,965, filed Mar. 12, 2018, Gopi Krishna Attaluri, et al.
(Continued)

*Primary Examiner* — Shyue Jiunn Hwa
(74) *Attorney, Agent, or Firm* — Robert C. Kowert; Kowert, Hood, Munyon, Rankin & Goetzel, P.C.

(57) ABSTRACT

Alternative portions of a query plan to perform a query may be selected for processing partial results of a query. A query engine may generate a plan to perform a query that includes an operation that selects between different portions of the plan according to input data. The input data may be a partial result of the query generated by the data store instead of the query engine and provided to the query engine. The input data may be an individual item of the data set that is modified to a different version within a consistent view of the data set for the query.

20 Claims, 9 Drawing Sheets

(51) Int. Cl.
*G06F 16/248* (2019.01)
*G06F 16/23* (2019.01)
*G06F 16/22* (2019.01)

(56) References Cited

U.S. PATENT DOCUMENTS

| | | |
|---|---|---|
| 8,150,889 B1 | 4/2012 | Bacthavachalu et al. |
| 8,359,316 B2 | 1/2013 | Franke et al. |
| 8,825,678 B2 | 9/2014 | Potapov et al. |
| 9,244,974 B2* | 1/2016 | Muras .................. G06F 16/2453 |
| 9,239,864 B2 | 9/2016 | Krishnamurthy et al. |
| 10,621,156 B1* | 4/2020 | Morkel ............... G06F 16/2365 |
| 10,885,031 B2 | 1/2021 | Chen et al. |
| 10,909,116 B2 | 2/2021 | Chakra et al. |
| 2003/0229639 A1 | 12/2003 | Carlson et al. |
| 2004/0133538 A1* | 7/2004 | Amiri ............... G06F 16/24539 |
| 2007/0130208 A1 | 6/2007 | Bornhoevd et al. |
| 2009/0254916 A1 | 10/2009 | Bose et al. |
| 2011/0302164 A1 | 12/2011 | Krishnamurthy et al. |
| 2013/0275452 A1 | 10/2013 | Krishnamurthy et al. |
| 2014/0114952 A1 | 4/2014 | Robinson et al. |
| 2014/0310232 A1* | 10/2014 | Plattner ............. G06F 16/24552 707/602 |
| 2016/0063021 A1 | 3/2016 | Morgan et al. |
| 2016/0342653 A1 | 11/2016 | Chen et al. |
| 2017/0004173 A1 | 1/2017 | Simitsis et al. |
| 2017/0102866 A1* | 4/2017 | Calvillo ................. G06F 16/958 |
| 2017/0180567 A1* | 6/2017 | Sharma ............. H04M 3/42153 |
| 2017/0199910 A1 | 7/2017 | Konik et al. |
| 2018/0032574 A1 | 2/2018 | Vandenberg |
| 2018/0046643 A1 | 2/2018 | Brodt et al. |
| 2019/0087461 A1 | 3/2019 | Hu et al. |
| 2019/0384759 A1 | 12/2019 | Cappiello et al. |
| 2020/0201860 A1 | 6/2020 | Vogelsgesang et al. |
| 2020/0210398 A1 | 7/2020 | Liu et al. |
| 2020/0295757 A1 | 9/2020 | Choi et al. |
| 2020/0334254 A1 | 10/2020 | Arye et al. |

OTHER PUBLICATIONS

U.S. Appl. No. 16/457,154, filed Jun. 28, 2019, Sangyong Hwang, et al.
U.S. Appl. No. 17/116,923, filed Dec. 9, 2020, Shriram Sridharan, et al.
Makreshanski, Darko, et al., "Batch DB: Efficient Isolated Execution of Hybrid OLTP+OLAP Workloads for Interactive Applications," Proceedings of the 2017 ACM International Conference on Management of Data, May 14-19, 2017, pp. 37-50.
Ozcan, Fatma, et al., "Hybrid Transactional/Analytical Processing: A Survey," Proceedings of the 2017 ACM International Conference on Management of Data, May 14-19, 2017.
Thant, Phyo Thandar, et al., "Hybrid Query Processing System (HQPS) for Heterogeneous Databases (Relational and NoSQL)," Proceeding of the International Conference on Computer Networks and Information Technology, 2014, pp. 1-5.
Kemper, Alfons, and Thomas Neumann. "HyPer: A hybrid OLTP&OLAP main memory database system based on virtual memory snapshots." 2011 IEEE 27th International Conference on Data Engineering. IEEE, 2011. (Year: 2011).

* cited by examiner

SELECTING ALTERNATE PORTIONS OF A QUERY PLAN FOR PROCESSING PARTIAL RESULTS GENERATED SEPARATE FROM A QUERY ENGINE

BACKGROUND

Some databases, such as Online Transaction Processing (OLTP) databases, may bring data pages to a query engine and then perform various operations to process the data pages in order to service database queries. The data pages may be stored in a cache (e.g., a buffer pool) for the query engine in order to provide quick access. In such databases individual or small (e.g., single page read and single write) queries can be answered quickly and with minimal network traffic as pages may be often already stored in the cache.

For analytical queries (e.g., queries with "fat" workloads, such as large, grouped aggregate queries performed by Online Analytical Processing (OLAP) databases), caching pages at the query engine provides much less of a performance benefit. For example, a large query may fill up and thus "pollute" the cache with results only relevant to the one large query so that when another query is processed the cache holds no relevant data to that query. Therefore, databases that bring data pages to the query engine may suffer performance penalties when performing certain kinds of queries.

Figure 1:
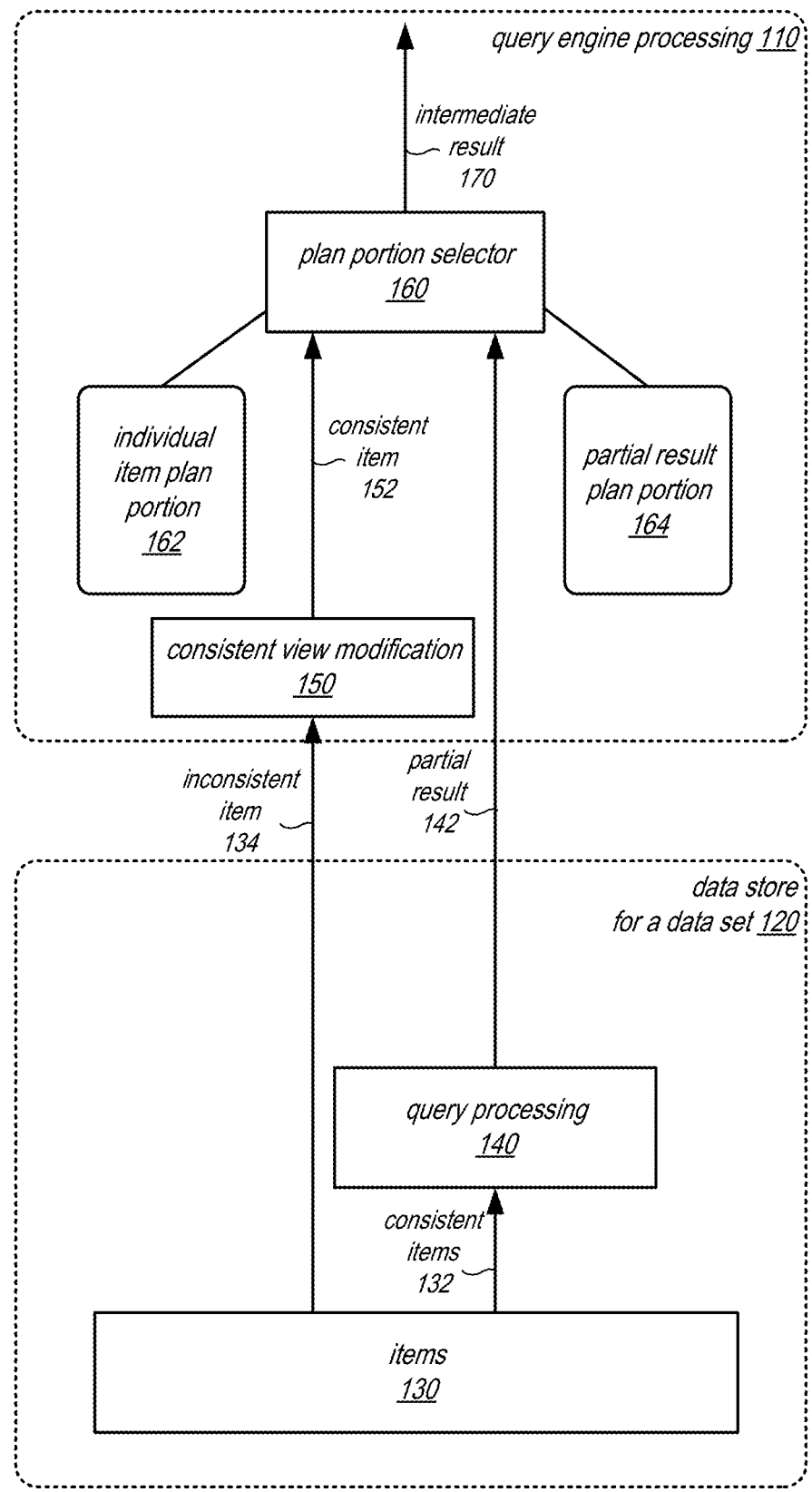
FIG. 1 is a logical block diagram illustrating selecting alternate portions of a query plan for processing partial results generated separately from a query engine, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for selecting alternate portions of a query plan for processing partial results generated separately from a query engine are described. Some databases, such as OLTP-style databases (e.g., MySQL or PostgreSQL), may perform processing for database queries at the database or query engines by retrieving relevant data from storage and performing processing, in some embodiments. Such techniques can be very performant in scenarios where the results of multiple queries can be cached in a buffer pool for a database or query engine, in some embodiments, allowing individual queries to be answered quickly from the buffer pool and with minimal network traffic (often a single page read and a single write). For other queries that return large results that can operate on multiple pages at a time, caching results in a buffer pool may not provide similar benefits, in some embodiments. Processing some of a query at the storage level before transferring results to a query engine may offer flexibility to database or query engines to allow users and/or database or query engines to intelligently choose when to perform processing at a database or query engine or shift processing to storage for the database which may leverage parallel performance capabilities of a distributed storage system, in some embodiments.

For example, OLTP style queries could be processed using a buffer pool, while OLAP style queries could be partially performed in storage, in parallel, in some embodiments. Moreover, storage level parallel query processing may allow for concurrent or overlapping performance of different types of queries without interference (e.g., long running OLAP queries that do not effect concurrently received OLTP queries) on the same query engine, in embodiments. In this way, the performance of database or query engines or other systems that perform database queries can improved (e.g., increased query speed, reduced network bandwidth, increased capacity to perform other types of queries, among other performance improvements) by leveraging parallel query processing for some queries in order to take advantage of the greater number of resources that perform parallel query processing, in some embodiments.

While shifting some query processing to storage, instead of at a query engine may offer many performance benefits, a consistent view of the data set for reading the data set to perform a query may still be used to retain complicity with some query processing schemes, such as Atomicity Consistency Isolation Durability (ACID). When a query is performed, a consistent state corresponding to a point in time for the query may be visible when each portion of the data set is evaluated for the query, in some embodiments. For example, if changes to a data set are tracked using time stamps or logical sequence numbers (LSNs), then an LSN value indicating a consistent view of the data set may be applied to a query so that the value of each portion of the data set as it would have been at the time corresponding to the LSN value should be evaluated to see if the value satisfies the query. Because the authority for consistent views may be a query engine (e.g., because a distributed data store may maintain multiple copies of data not all of which may be storing the same version of the data set and the query engine may maintain information to describe earlier versions of the data set), the query engine may enforce a consistent view with respect to the data included in a query.

As a result, different techniques may be implemented for handling different types of data retrieved from a data store with pre-transfer processing applied (e.g., data within a consistent view and data outside a consistent view), in various embodiments. Selecting alternative portions of a query plan for processing partial results generated from a query engine may be implemented to dynamically adapt the query plan according to the type of data, within or without a consistent view. In this way, pre-transfer processing can proceed and allow the query engine to resolve and combine items that are modified with partial results generated at the storage level, allowing for both the performance benefits of pre-transfer query processing (including parallelization) and maintaining a consistent view for compliance with query processing requirements like ACID.

FIG. 1 is a logical block diagram illustrating selecting alternate portions of a query plan for processing partial results generated separately from a query engine, according to some embodiments. Query engine processing 110 may be implemented as part of a database system (e.g., as part of a database management system and storage engine) to perform queries directed to items, such as items 130 in data store for a data set 120. A query may be received at query engine 110 that may include a function such as aggregation or grouping, as discussed below with regard to FIGS. 4A-7, some of which can be performed at the data store for the data set 120 before transfer of the data to query engine processing 110.

For example, query engine processing 110 may send request(s) (not illustrated) for data with an operation, such as aggregation and/or grouping to be applied to data store for the data set 120. Query processing 140 may be applied at data store 120 to consistent items 132 (which may be within a consistent view of items 130 for the query). The partial result 142 may be provided to query engine processing 110. For those items identified as inconsistent with the consistent view, like item 134, query engine processing 110 may receive the item 134 and apply consistent view modification 150 to restore the value(s) of the item to a state within the consistent view (e.g., by applying one or more undo log records).

Plan portion selector 160 may be an operation implemented as part of a query plan that dynamically selects between different portions of the plan (e.g., different evaluation or modification expressions) according to the input data. For example, for consistent item 152 modified at query engine processing 110, individual item plan portion 162 may be selected (e.g., to determine how to integrate an individual item into an intermediate result 170 for a query that is performing a type of aggregation function). For partial result 142 received from data store 120, plan portion selector 160 may select partial result plan portion 164. The output of plan portion selector 160, intermediate result 170, may be indistinguishable, in some embodiments, to a dependent operation (e.g., an operation that incorporates the intermediate result 170 into a final result) whether individual item plan portion 162 and/or partial result plan portion 164 are performed.

Please note, FIG. 1 is provided as a logical illustration and is not intended to be limiting as to the physical arrangement, size, or number of components, modules, or devices to implement such features.

The specification first describes an example of a provider network that may implement a database service and storage service, according to various embodiments. Included in the description of the example network-based services to perform queries that select alternate portions of a query plan for processing partial results generated at the storage service. The specification then describes a flowchart of various embodiments of methods for selecting alternate portions of a query plan for processing partial results generated separately from a query engine. Next, the specification describes an example system that may implement the disclosed techniques. Various examples are provided throughout the specification.

Figure 2:
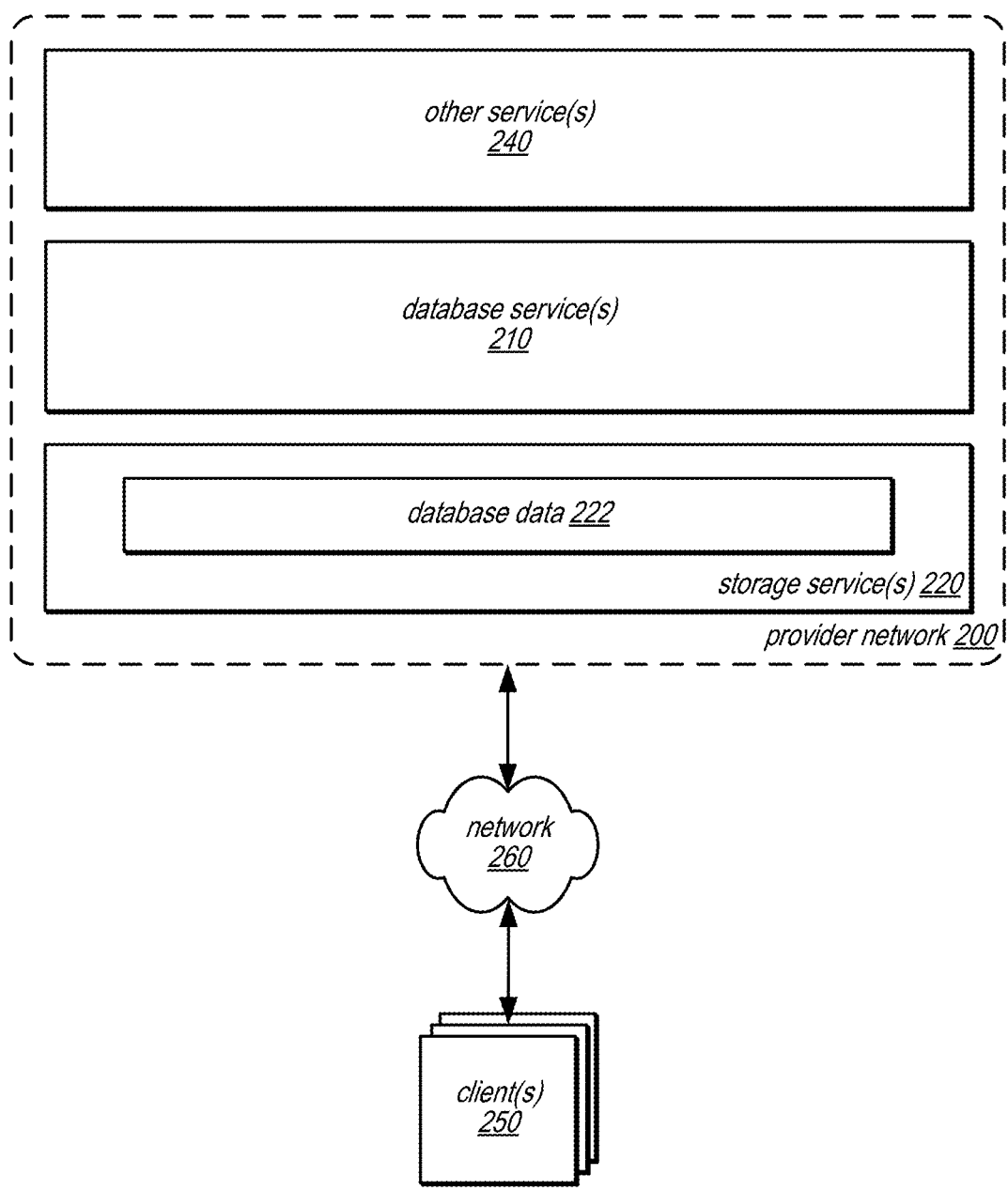
FIG. 2 is a logical block diagram illustrating a provider network that implements a database service and separate storage service that implements selecting alternate portions of a query plan for processing partial results generated separately from a query engine, according to some embodiments.

FIG. 2 is a logical block diagram illustrating a provider network that implements a database service and separate storage service that implements selecting alternate portions of a query plan for processing partial results generated separately from a query engine, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200.

In some embodiments, provider network 200 may implement various network-based services, including database service(s) 210, a storage service(s) 220, and/or one or more other virtual computing services 240 (which may include various other types of storage, processing, analysis, communication, event handling, visualization, and security services). Database service(s) 210 may implement various types of database systems and formats (e.g., relational, non-relational, graph, document, time series, etc.) and the respective types of query engines to perform queries to those databases. For example, database service(s) 210 may implement an OLTP query engine to provide fast and efficient transaction processing for a relational database stored as database data 222 in storage service(s) 210. Storage service(s) 220 may include many different types of data stores, including a log-structured storage service as discussed below with regard to FIG. 3, in some embodiments.

Clients 250 may access these various services offered by provider network 200 via network 260. Likewise network-based services may themselves communicate and/or make use of one another to provide different services. For example, storage service 220 may store data 22 for databases managed by database service 210, in some embodiments. It is noted that where one or more instances of a given component may exist, reference to that component herein may be made in either the singular or the plural. However, usage of either form is not intended to preclude the other In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to execute a transaction or query with respect to a database that includes a function, such as an aggregation function that causes some query processing to be performed at storage service(s) 220 before a partial result is sent to database service(s) 210, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application, a web server, a media application, an office application or any other application that may make use of provider network 200 to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture. In at least some embodiments, some clients of a database may be implemented at one or more computing resources (e.g., a virtual computing resource of other service(s) 240) within provider network 200, similar to client(s) 250.

In some embodiments, a client 250 (e.g., a database service client) may provide access to a database hosted in database service 210 to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders, in one embodiment. In such an embodiment, applications may not need to be modified to make use of the storage system service model. Instead, the details of interfacing to provider network 200 may be coordinated by client 250 and the operating system or file system on behalf of applications executing within the operating system environment.

Client(s) 250 may convey network-based services requests (e.g., a request to query a database) to and receive responses from services implemented as part of provider network 200 via network 260, in some embodiments. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Services within provider network 200 (or provider network 200 itself) may implement one or more service endpoints to receive and process network-based services requests, such as requests to access data pages (or records thereof), in various embodiments. For example, provider network 200 services may include hardware and/or software to implement a particular endpoint, such that an HTTP-based network-based services request directed to that endpoint is properly received and processed, in one embodiment. In one embodiment, provider network 200 services may be implemented as a server system to receive network-based services requests from clients 250 and to forward them to components of a system within database service 210, storage service 220 and/or another virtual computing service 240 for processing.

In some embodiments, provider network 200 (or the services of provider network 200 individually) may implement various user management features. For example, provider network 200 may coordinate the metering and accounting of user usage of network-based services, including storage resources, such as by tracking the identities of requesting clients 250, the number and/or frequency of client requests, the size of data tables (or records thereof) stored or retrieved on behalf of user, overall storage bandwidth used by users or clients 250, class of storage requested by users or clients 250, or any other measurable user or client usage parameter, in one embodiment. In one embodiment, provider network 200 may also implement financial accounting and billing systems, or may maintain a database of usage data that may be queried and processed by external systems for reporting and billing of client usage activity. In some embodiments, provider network 200 may be to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 240 (or the underlying systems that implement those services).

In some embodiments, provider network 200 may also implement user authentication and access control procedures. For example, for a given network-based services request to access a particular database, provider network 200 may implement administrative or request processing components that may ascertain whether the client 250 associated with the request is authorized to access the particular database. Provider network 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, provider network 200 may reject the corresponding network-based services request, for example by returning a response to the requesting client 250 indicating an error condition, in one embodiment. Various access control policies may be stored as records or lists of access control information by database service 210, storage service 220 and/or other virtual computing services 230, in one embodiment.

Figure 3:
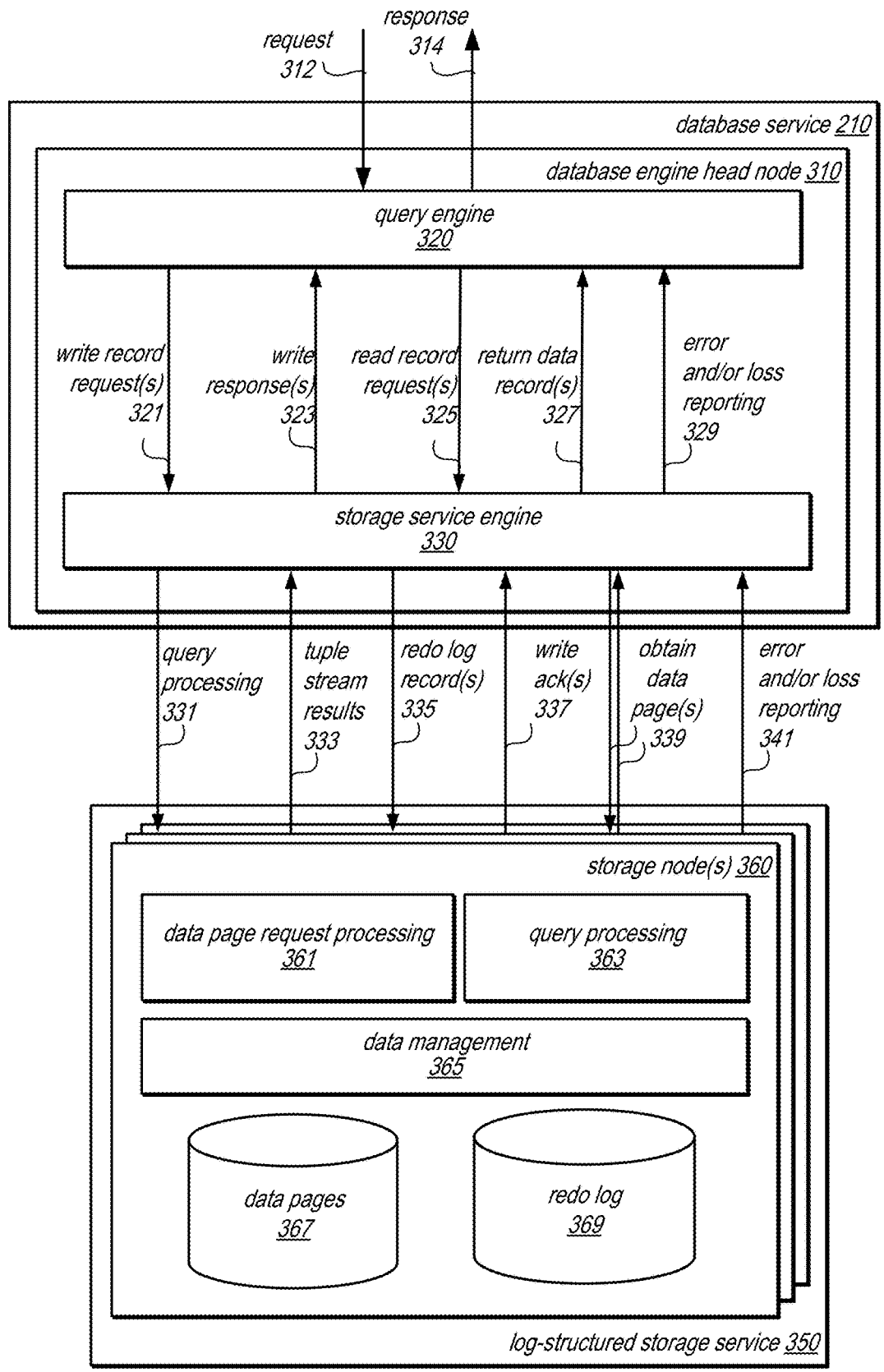
FIG. 3 is a logical block diagram illustrating various components of a database service and separate storage service, according to some embodiments.

FIG. 3 is a logical block diagram illustrating various components of a database service and separate storage service, according to some embodiments. Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system and/or may be one of storage service(s) 220 in FIG. 2). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

Figure 6:
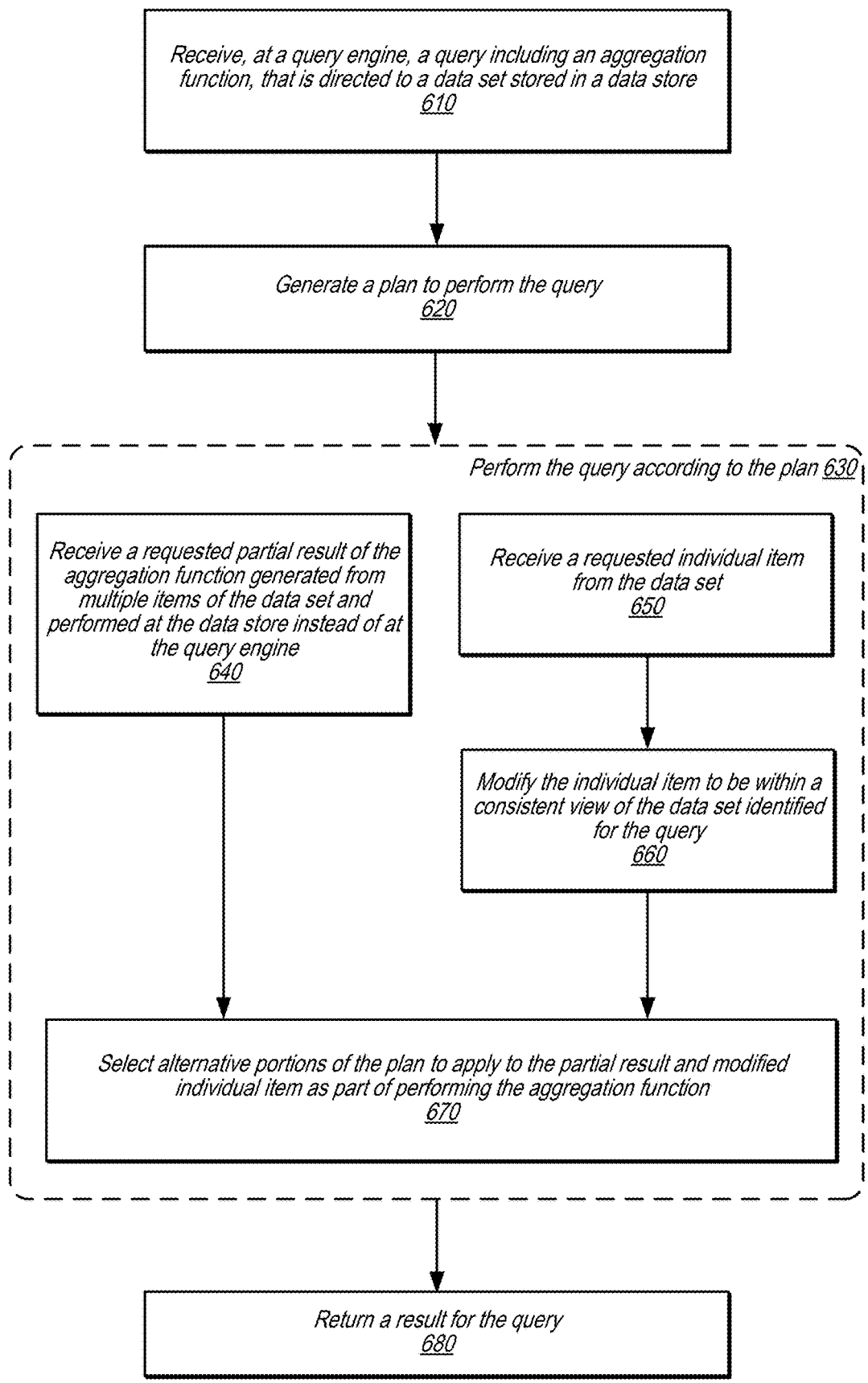
FIG. 6 is a high-level flow chart illustrating methods and techniques for selecting alternate portions of a query plan for processing partial results generated separately from a query engine, according to some embodiments.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s), such as the plan discussed below with regard to FIG. 6. Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database from dirty tuples received from storage nodes, as discussed below, or providing undo or other consistency information to another system. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or a generate a result of a query sent as a response 314.

In another example, a request 312 that is a query may cause computations associated with query processing 331 may be sent to the storage nodes 360 for processing (e.g., the processing may be distributed across the storage nodes). As illustrated, results from the processing (e.g., in the form of tuple stream results 333) may be provided back the database engine, in embodiments. For instance, query processing requests 331 may uses the message passing framework of storage service engine 330. In some embodiments, all communication may be initialized from the storage service engine 330. In embodiments, communication may not be initialized from the storage node side. In some embodiments, storage service engine 330 may use a "long poll" mechanism for creating a storage level query processing session (e.g., for performing parallel query processing) for each query processing operation 331 sent, in some embodiments. In some embodiments, the same message framework may be used for receiving periodic progress updates (e.g., heart-beats) from each storage node while the query is being processed (not illustrated in FIG. 5). In some embodiments, a storage node 360 may notify the query engine 320 when query processing (e.g., on a batch) has been completed, for example, providing a handle that the query engine can use to pull the results from storage nodes 360. In some embodiments, the flow control may be implemented on the head node side. In some embodiments, the message format may implement a header containing control metadata, and data (rows/tuples) sent as raw data.

If a storage node fails (this may include less-than-complete failures, e.g. a process failure for query processing), the corresponding request (e.g., to process a batch of pages or tuples) may be resubmitted to another storage node that stores the data (e.g., a full segment from the same protection group (PG)). In another example, if a previous storage node fails while transmitting the tuple stream results 333 back to the head node 310, the head node 310 may keep the results already received, and only transfer the remainder from the new storage node, in some embodiments. In such embodiments, storage nodes 360 may provide results in a deterministic order, in some embodiments. In some embodiments, it may be tolerable for data to be processed in any order convenient and/or in parallel across storage node(s) 260 each of which may perform query processing for a different part of the same database (e.g., in parallel fashion). In some embodiments, storage nodes 360 may spill results to persistent storage if, for example, a memory buffer for results becomes full, while in other embodiments that cannot spill results to persistent storage processing may pause until further results can be fit in storage (or the process may be aborted).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages 367 and a change log 369 (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments.

In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, query processing 363, and data management 365 to implement various ones of these features with regard to the data pages 367 and redo log 369 among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages responsive to be returned responsive to a request. Query processing 363 may handle requests to return values from a database (e.g., tuples) with various query processing operations applied before returning the values (e.g., filtering, aggregating, sorting, etc.).

In at least some embodiments, storage nodes 360 may provide multi-tenant storage so that data stored in part or all of one storage device may be stored for a different database, database user, account, or entity than data stored on the same storage device (or other storage devices) attached to the same storage node. Thus, data page request processing 361 and query processing 363 may be limited in the number of resources available for performing data page request processing 361 and query processing 363 (e.g., such as the techniques discussed below with regard to FIG. 7) in order to ensure that data page request processing and query processing for other databases may also be performed, in some embodiments. Various access controls and security mechanisms may be implemented, in some embodiments, to ensure that data is not accessed at a storage node except for authorized requests (e.g., for users authorized to access the database, owners of the database, etc.). In some embodiments, user-influenced input (query, perhaps in some processed form) and data pages may shift query processing from a single-tenant environment (e.g., a database head node) to a multi-tenant environment (e.g., storage node). In order to provide additional security, query processing 363 may be done in a standalone process, with a software "jail" built around it, using a downgraded security context, seccomp, cgroups, and potentially other hostile code execution mitigation techniques, in embodiments. The attack surface may be minimized by using a minimal subset of query processing code, and performing the initial query parsing on the query engine 320, in some embodiments.

In some embodiments, query processing 363 should not disrupt regular processing of access requests to read or obtain data pages 339 or write redo log records 335. In some embodiments, a process (e.g., a daemon) for query processing may have a hard limit of the memory and CPU footprint, to guard against resource drain, for example. In embodiments, query processing may be performed in a separate address space in order to provide failure isolation. In this way, a bug in query processing 363 would not impact regular page request or management operations (e.g., storing redo log records, returning data pages, coalesce operations, etc.), in some embodiments. Such precautions may isolate memory leaks and runaway resource consumption in general.

Query processing 363 at storage nodes 360 may only process tuples that are known to be safe to process on the storage nodes 360 (e.g., visible to a database query), and send other tuples directly to the head node without processing, in some embodiments (e.g., as part of a separate dirty tuple stream (not illustrated)).

In embodiments, query processing 363 may be performed in a streaming fashion (e.g., for efficiency). In some embodiments, materialization of query processing results (e.g., in-memory or other storage) may facilitate blocking query operations, like hash partition, sort, and group aggregation (although group aggregation may decomposable so group aggregation operations may not necessarily materialize the entire result). In another example, if the head node is consuming query processing results slowly or unevenly, materialization can be a form of buffering. In yet another example embodiment, materialization on storage nodes can allow storage nodes to complete processing and release or advance garbage collection point in times sooner, without waiting for the head node to consume the entire result. In this way, garbage collection may not be delayed, in some embodiments. In some embodiments, materialization on a storage may coincide with embodiments that ensure cleanup. In embodiments, materialization on the storage node may be part of the existing volume. In other embodiments, materialization may coincide with creation of a new temporary space for storing query processing results.

In some embodiments, to perform query processing at a storage node, query engine 320 may open a parallel operation session with storage service engine. 330 (not illustrated). The parallel operation session may allow storage service engine 330 to impose parallel processing limits (e.g., no more than 10 parallel operations sessions for a head node). Query engine 320 may send a request to storage service engine 330 to start batch processing. Client-side driver in turn may send a request to start query processing at storage nodes in parallel in order to increase the performance of a query operation (e.g., an aggregation, filtering, scan, etc.). The start requests and may include information to perform the parallel query operation, such as including information to perform the portion of the plan assigned to storage nodes. For example, the start requests may include a read LSN, a read view, a list of pages to scan, an op chain (to apply to clean tuples), a segment id, a schema, filters or other operations to apply to dirty tuples, among other information, in some embodiments. In some embodiments, a schema parser may be sent. Storage nodes 360 may store results in result buffers, which query engine 320 may request from storage service engine 330 which may in turn request the results from the result buffers in storage node(s) 360. Storage nodes 360 may provide the current results in the clean and dirty buffers back to storage service engine 330 which may provide the results back to query engine 320. Query engine 320 may poll for results for a query processing (e.g., for an operation) overtime, in some embodiments. Query engine 320 may repeat the requests one or multiple times, in some embodiments for other operations. When performance of the query operation is completed, then query engine 320 may close the parallel operation session with storage service engine 330, in some embodiments.

Figure 4A:
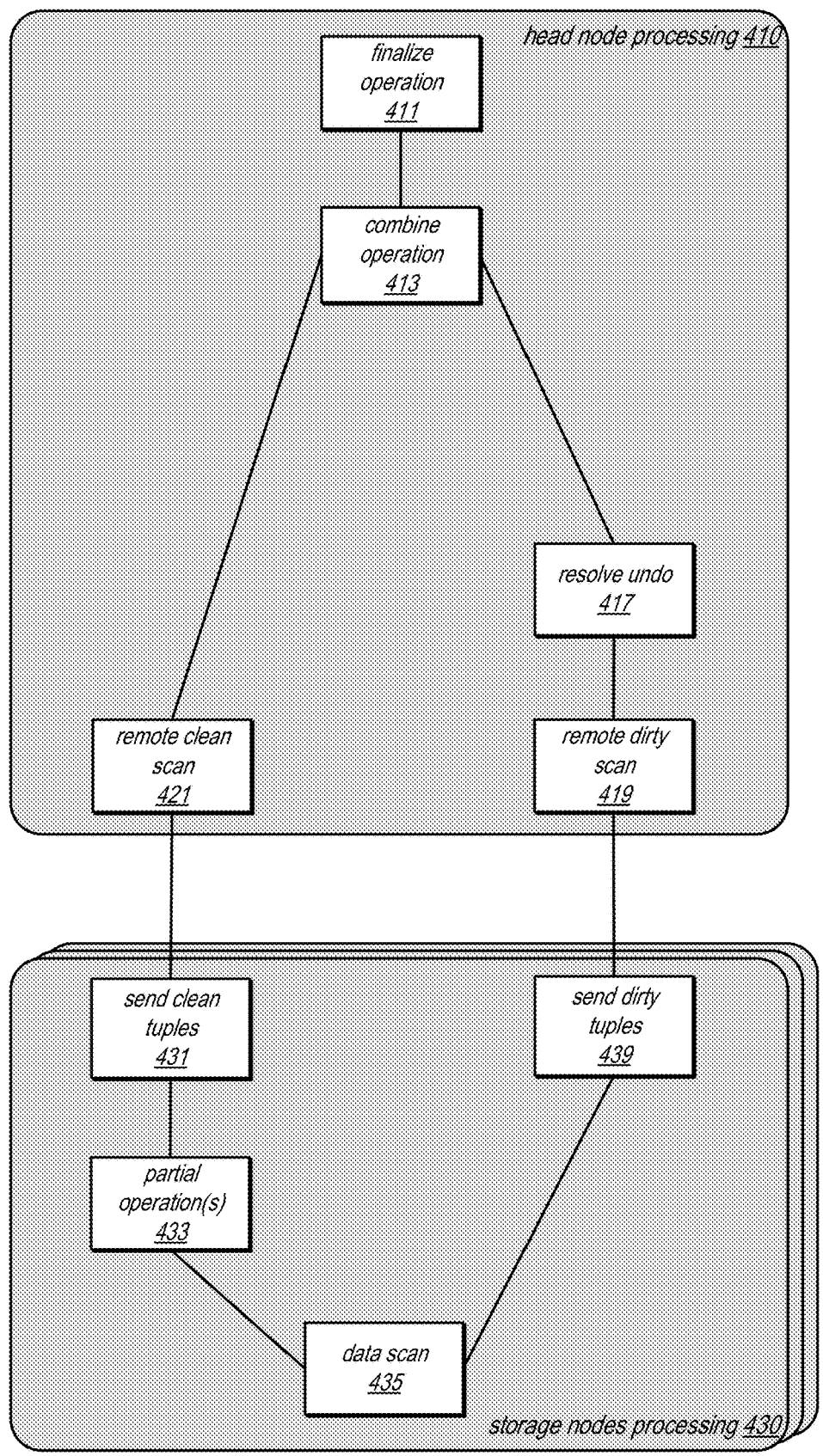
FIGS. 4A and 4B illustrate example query plans for selecting alternate portions of a query plan for processing partial results generated separately from a query engine, according to some embodiments.
Figure 4B:
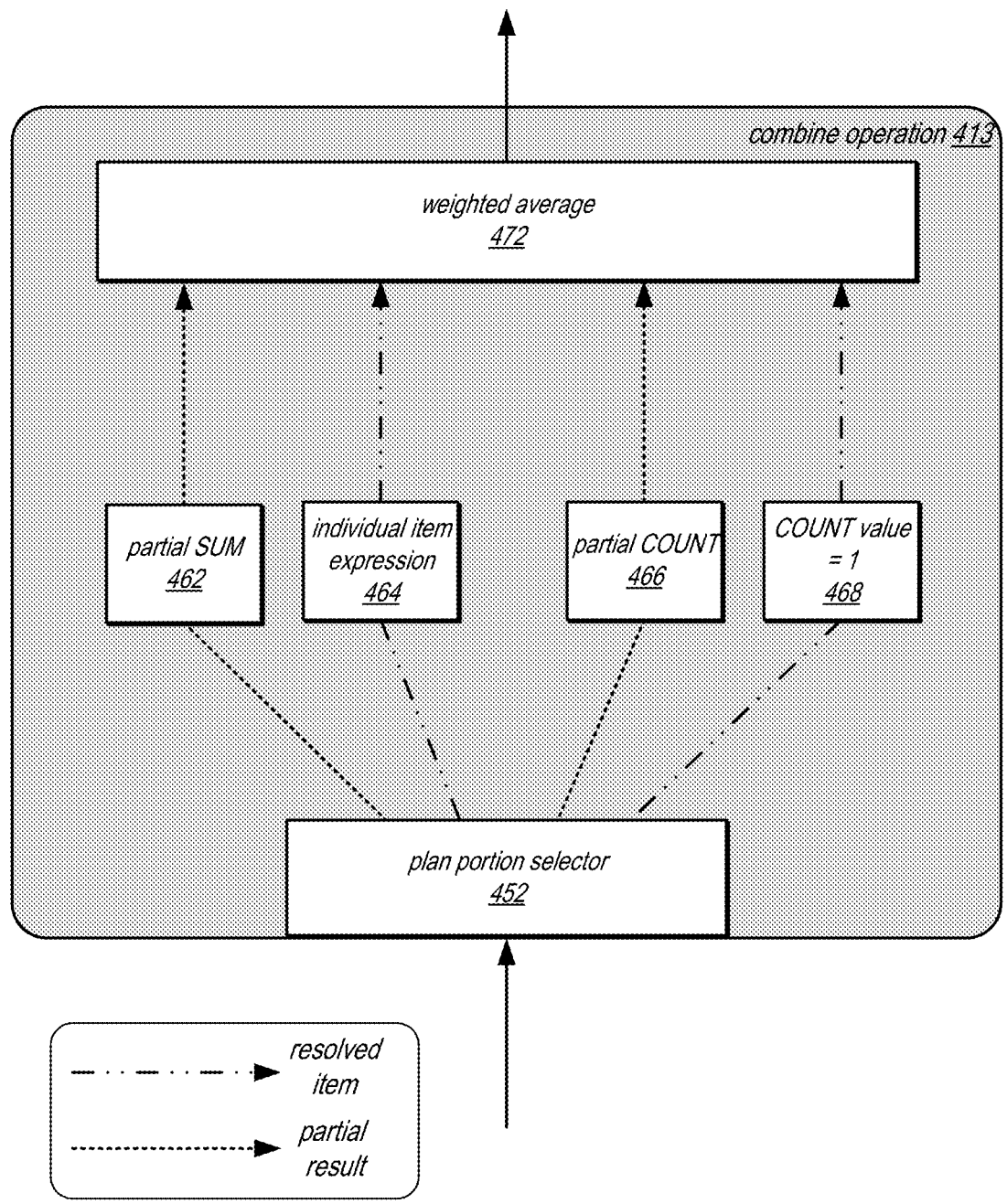

Query engine 320 may implement query planning that accounts for providing a consistent view of a database even when pre-transfer processing is performed at storage nodes 360 (e.g., as part of a parallel operation session). FIGS. 4A and 4B illustrate example query plans for selecting alternate portions of a query plan for processing partial results generated separately from a query engine, according to some embodiments. Query planning (e.g., performed by a database engine head node) may apply various techniques to determine whether a parallel query operation should be included or otherwise selected to perform as part of performing a database query, in some embodiments. For example, pre-transfer processing may be specified for a database query in an indication, or may be determined automatically based on one or more criteria that identifies a performance benefit in some embodiments.

Query engine 320 that includes the possibility of performing a query operation at storage node(s) 360 (e.g., in parallel) may perform various query planning techniques including a cost forecast or estimation for different query plans (or portions thereof) to perform a database query, selecting the lowest cost query plan, in some embodiments. A cost estimate or value may be determined for query processing operations performed at storage node(s) 360 as part of generating a query plan that includes a query operation assigned to storage node(s) 360, in one embodiment. For example, a table size (e.g., in physical storage, bytes, or logical size, number of records) may be multiplied by a parallel query operation cost multiplier, in some embodiments, to determine a parallel query operation cost estimate.

In addition to determining whether to include a query operation assigned to storage nodes in the query plan to perform a database query, query planning may also include determining how the query operation is to be performed, including what operations may be performed as part of the query operation at the storage nodes (and correspondingly what operations may remain in the head node for performance). As illustrated in FIG. 4A, a query plan that includes a query operation performed at storage node(s) may be divided in to head node processing 410 and storage nodes processing 430 portions. The query plan may further indicate different plan portions for different types of data (e.g., tuples) to be returned from parallel query operations. For example, the plan may include an operation for performing a remote scan operation for clean tuples 421 (which may be visible to the database query as stored at the storage nodes), in some embodiments. Similarly, a separate operation for performing a remote scan operation for dirty tuples 419 may be included. In some embodiments, other query plan selection techniques may be implemented. For example, plan generation rules or criteria may be applied to select between scenarios when storage node processing versus head node processing is performed (e.g., when a join is specified in the query storage node processing is automatically selected), in some embodiments.

The sub-plan or portion that describes the performance of parallel processing at storage nodes may include one or more other operations. For example, storage nodes processing 430 may include a data scan operation 435 to scan identified storage locations (e.g., the pages discussed above with regard to FIG. 3). For clean tuples, partial operation(s) 433, such as groupings or aggregations may be performed or applied to filter, exclude, or otherwise pre-process the clean tuples to provide query results, in some embodiments. These clean tuples may then be sent on, as indicated by operation 431 back to the head node, in some embodiments. For dirty tuples identified as part of scan 435, the dirty tuples may be sent on, as indicated by operation 439 (though some filtering or processing operations may still be performed at the storage nodes). Once received, further processing may be performed on the dirty tuples, such as a resolve undo operation 417, which may determine whether or not undo records need to be applied to tuples in order to generate a version of the dirty tuples that is visible to the database query, in some embodiments. Combine operation 413 may describe how to combine the clean tuples with the processed dirty tuples at a head node before finalizing the query results at operation 411 to return to a client that requested the database query, in some embodiments, (e.g., finalizing results from a single partition or segment of a database together, as discussed in detail below with regard to FIG. 4B. Note that in some embodiments, resolve undo 417 could be performed at storage nodes before sending the result.

For instance, combine operation 413 may include one or multiple sets of different expressions that may be applied differently to different input data. In some embodiments, combine operations, like combine operation 413, may be determined differently according to the type of operations being assigned to storage nodes. For instance, some operations may be performed similarly once undo resolve 417 is performed, such as maximum, minimum, bit_and, bit_or, and bit_xor may involve applying the same type of plan portion whether obtained from a dirty or clean stream of tuples. However, in other scenarios, for an example where the aggregation function is an average, plan portion selector 452 may be included to direct partial results to expressions that divide (or evaluate) the input data into the partial sum 462 and partial count 466 values. These values can then be used to update a weighted average 472, which may ultimately provide an accurate average value for partial results received from different storage nodes at different times. For resolved items, with modified values to be within the consistent view, different expressions may be applied by plan portion selector 452. For example, the average is an average of an offered good's price, then the price calculation may be performed at individual item expression 464 (which would have been performed at the storage node for pre-transfer processing), where price=sale price*(1+tax). The count value for an individual item, as indicated at 468 may be fixed at 1. Then such features determined for the resolved item at 464 and 468 may be provided to weighted average 472. Other operations, such as average, variances, standard deviations, and so on, may also include different expressions to be evaluated according to the source of the tuple (e.g., clean or dirty) that may be applied by selector operation 452, in various embodiments.

Figure 5:
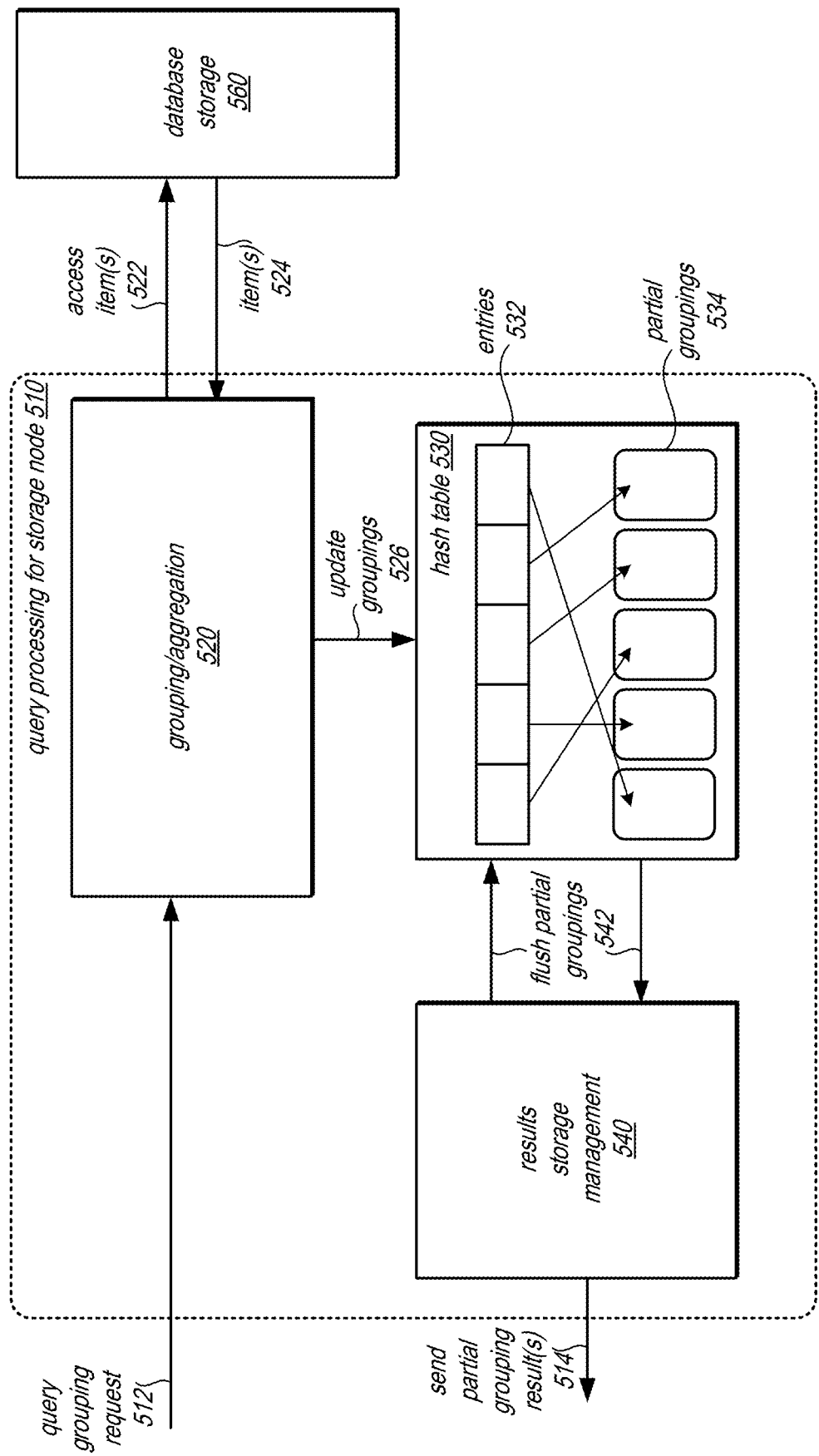
FIG. 5 is a logical block diagram illustrating query processing at a storage node, according to some embodiments.

FIG. 5 is a logical block diagram illustrating query processing at a storage node, according to some embodiments. Query processing for storage node 510 (e.g., similar to query processing 363 discussed above with regard to FIG. 3) may performing grouping and/or aggregation as part of performing a request to perform pre-transfer query processing at a storage node. Query grouping request 512 may be received which may indicating a group by value (e.g., a group by column, key, field, etc.) and/or other information for pre-transfer processing (e.g., a type of aggregation to apply to groups). Grouping/aggregation 520 may be performed upon reading or otherwise accessing item(s) 522 from database storage 560 (e.g., storage devices attached to a storage node as discussed above).

The returned item(s) 524 may be processed according to the request. For example, binary comparisons to identify different groups may be performed in some embodiments. In the event that an item is grouped differently according to a binary comparison because of a variation in data type representation (e.g., a postal code represented as a number versus a postal code represented as a string), then the different groups can be later combined at post-transfer grouping processing at the database engine head node, in some embodiments.

To efficiently and quickly maintain groupings at storage node before transfer, a hash table 530 may be implemented in storage. In some embodiments, hash table 530 or other storage structure for grouping or locating partial results may be implemented in volatile storage, such as various types of memory, however, other persistent storage technologies, such as non-volatile memory, may be used. Entries 532 of the hash table identified according to the application of hash function for the group by value may be used to point to the entry for a single value (e.g., an aggregated value) for partial grouping 534 or multiple values (e.g., a list of different record values) for partial grouping 534. Grouping/aggregation 520 may update 526 the partial grouping 534 in the location identified by the corresponding entry 532 identified by the application of the hash function, in some embodiments.

Query processing for storage node 510 may implement results storage management 540 which may identify when to send 514 partial groupings (and other pre-transfer processing results not illustrated) to a query engine. For example, as discussed below with regard to FIG. 7, a flush limit on the size may be identified for hash table 530. Storage nodes may be multi-tenant, storing and processing access requests to data for other users, client accounts, database volumes for other databases, and so on. A flush limit may prevent one hash table (or other storage structure) for one database monopolizing the resources of a storage node processing other requests for other database volumes handled by the same storage node (e.g., query processing or data page requests as discussed above with regard to FIG. 3). Results storage management 542 may flush partial groupings 542 from hash table 530 to reduce the size of hash table, in some embodiments.

The database service and storage service discussed in FIGS. 2 through 5 provide examples of a system that may perform selecting alternate portions of a query plan for processing partial results generated separately from a query engine. However, various other types of data stores (e.g., non-log structured) or other storage engines may implement selecting alternate portions of a query plan for processing partial results generated separately from query engine. FIG. 6 is a high-level flow chart illustrating methods and techniques for selecting alternate portions of a query plan for processing partial results generated separately from a query engine, according to some embodiments. Various different systems and devices may implement the various methods and techniques described below, either singly or working together. For example, a database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 610, a query may be received at query engine including an aggregation function that is directed to a data set stored in a data store. A data set may include one or more collections and/or structures of different items (e.g., one or more tables of records stored in relational format, one or more groupings, sets, or tables of key-value pairs stored in non-relational format, etc.), in some embodiments. A query may be a request received via a programmatic interface (e.g., an API request to perform the database query), in some embodiments. The query may be received via a connection that supports a protocol or language for the query (e.g., Structured Query Language (SQL)) via a JDBC or ODBC driver.

Various types of aggregation functions may be included in the query, alone or in combination with other functions. For example, in some embodiments, aggregation functions may include minimum value, maximum value, summation, average, count, binary operations (e.g., bitwise AND, bitwise OR, bitwise XOR), population variance, sample variance, standard deviation of a population, standard deviation of a sample, among others. Aggregation functions may be further refined or combined with other operations, such as grouping functions for distinct groupings, in some embodiments (as discussed above with regard to FIG. 5 and below with regard to FIG. 7.

As indicated at 620, a plan to perform the query may be generated, in some embodiments. For example, the query may be parsed into symbol or parse tree form and then evaluated according to one or more planning and optimization rules. In some embodiments, the planning and optimization rules may be applied to recognize portions of query processing that can be shifted from the query engine to the data store (which may be capable of performing some query processing prior to sending results back to the query engine-saving network bandwidth and increasing query performance through parallelization of query processing in distributed storage environments). Such operations that may be shifted (at least in part) may include operations such as aggregation functions and grouping functions, as discussed above with regard to FIGS. 3 and 5.

The results of shifted operations may have to account for changes to the data set that could occur concurrently with the performance of the query (e.g., transactions or other updates to data). Because some of these changes would alter the results of the query, a consistent view of the data set for reading and generating a result for the query from the data set may be applied. As part of applying that consistent view, the plan for performing the query may have to handle both the shifted processing of some operations and the application of modifications to some items to return the values of the items to be within the consistent view for the query, which may prevent processing of those items at the data store. Therefore, generating the plan to perform the query may include operations or features that implement a requested feature of a query, like an aggregation function, differently according to the input data being evaluated (e.g., a partial result returned from a data store or an individual item that is modified to be within the consistent view). Such operations or features may include pointers, links or other descriptors that identify which source or type of input data corresponds to which alternative portion of the query plan (e.g., which may apply or not apply various expressions or modification), as discussed above with regard to FIG. 4B.

For example, as indicated at 630, in various embodiments, the query may be performed according to the plan. The plan may include various other operations or features to accomplish the query (e.g., expressions, clauses, predicates, etc.) which may be performed which are not illustrated or discussed. However, as part of performing the query plan, operations to utilize query processing on the data store to perform part of the aggregation function may be implemented. For example, an operation to scan or request data from the data store and to aggregate (e.g., sum, count, average, with or without grouping, etc.) items before sending back the results may be sent to the data store. As indicated at 640, a requested partial result of the aggregation function generated from multiple items of the data set and performed at the data store instead of at the query engine, in some embodiments.

For those items which may not be within the consistent view of the data set for the query, a separate operation may be included in the plan to handle incoming items excluding from the partial result because they are not within the consistent view. For example, as indicated at 650, a requested individual item may be received from the data set, in some embodiments (e.g., a raw record). As indicated at 660, the individual item may be modified to be within the consistent view of the data set identified for the query, in some embodiments. For example, one or more undo log records may be applied to roll-back or revert a column's value in a record to an earlier value before a transaction modified the value.

As indicated at 670, alternative portions of the plan to apply the partial result and modified individual item may be selected as part of performing the aggregation function. For example, post-transfer aggregation operations (after pre-transfer aggregation operations performed at the data store) may involve different ways of combining the partial results with other partial results. Because an individual item may be manipulated differently in order to combine that item with the other partial results being combined into a single result for the aggregation function, the expressions, modifications, evaluations, or other operations to combine the individual item may be different (e.g., less or more than for the partial result). Consider the average aggregation function example discussed above with regard to FIG. 4B. In that example, the partial sum and partial count generated at the data store are passed through to the weighted average operation, while the individual item value may be manipulated (e.g., to calculate a price value). Therefor the alternative portions of the plan may be treated as a single logical portion of the plan (e.g., a single combine operation for aggregation) with the same input data and output data paths, but be internally applied differently according to the type or source of input data (e.g., modified individual item or partial result).

As indicated at 680, a result for the query may be returned, in some embodiments. For instance, query results may be combined from partial results generated at the data store along with results generated at the query engine (e.g., by retrieving data pages or other groups of records that are processed at the query engine and not at the data store) and returned to a user that submitted the query according to a same interface, in some embodiments. In some scenarios, the results may be generated solely from processing for the query performed at the data store (along with processing performed at the query engine to combine modified items with the partial results as depicted above).

Figure 7:
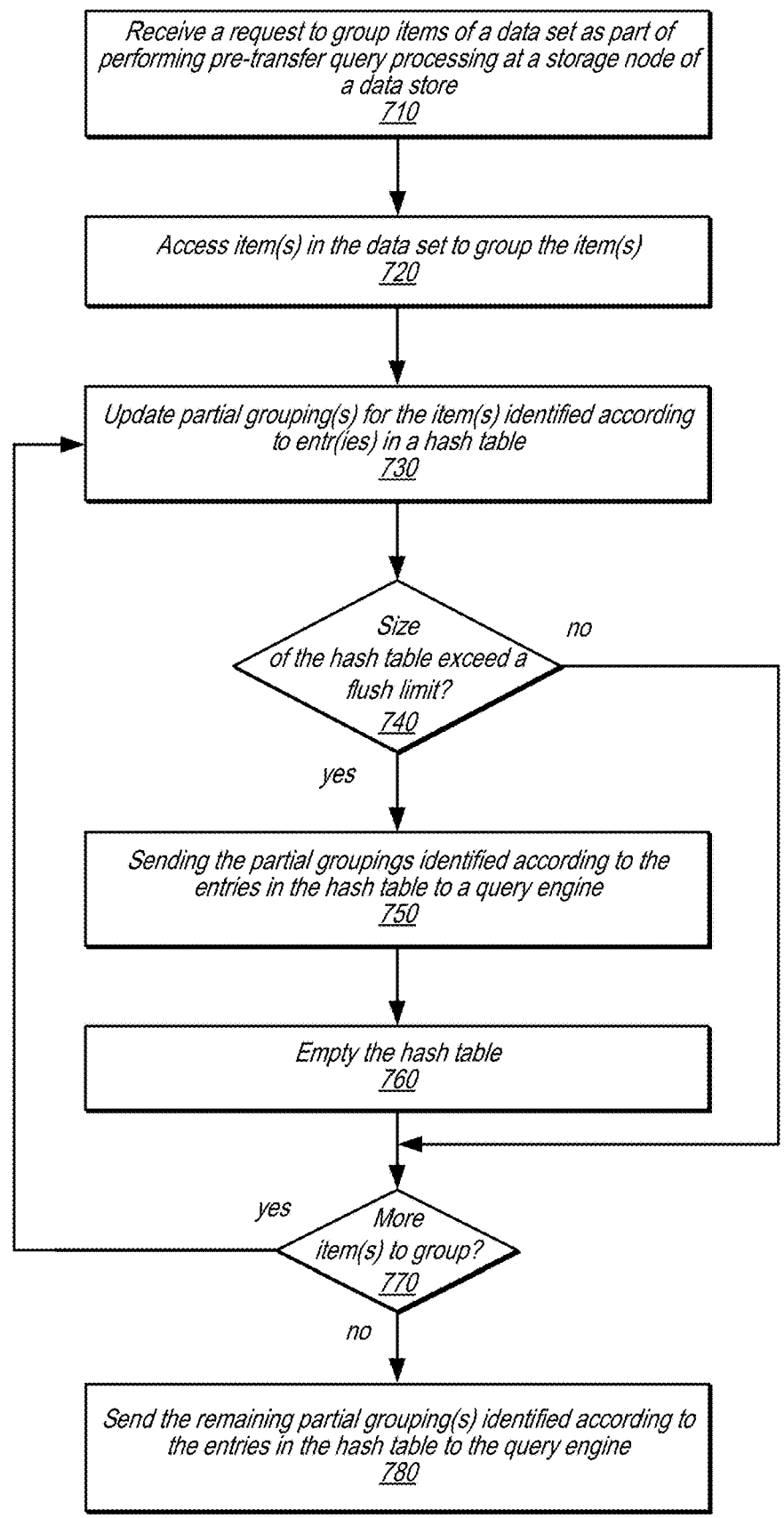
FIG. 7 is a high-level flow chart illustrating methods and techniques for generating partial grouping results for a query at a data store to be provided to a query engine, according to some embodiments.

As discussed above, aggregation functions may sometimes be modified or otherwise combined with other functions, such as a grouping function, which may also take advantage of pre-transfer processing at the data store. Techniques for grouping items before transfer from the data store may also be beneficially performed without being combined with an aggregation function. FIG. 7 is a high-level flow chart illustrating methods and techniques for generating partial grouping results for a query at a data store to be provided to a query engine, according to some embodiments.

As indicated at 710, a request to group items of a data set as part of performing pre-transfer query processing at a storage node of a data store may be received. As discussed above the grouping request may be combined with other processing requests like an aggregation function, but may also be applied on its own. As indicated at 720, item(s) in the data asset may be accessed to group the item(s), in some embodiments. For example, a table, column, object, or other set of items (or portion thereof) may be read from a storage device to compare in order to group the items. As discussed above with regard to FIG. 5, in some embodiments, binary comparisons may be performed to determine whether an item belongs to a group for more performant comparisons.

As indicated at 730, partial grouping(s) for the item(s) may be updated according to entr(ies) in a hash table, in some embodiments. For example, an in-memory hash table may be generated where the key (or other value) for grouping the items may be hashed, and thus mapped to an entry in the hash table, which may point to the grouping of items being maintained (e.g., an aggregated value or individual, non-aggregated values). For item(s) that do not have existing group according to the hash table entries, a new entry may be created in the hash table (or allocated to the item(s)).

While performing grouping on items for a query, memory management or other controllers for the performance of the data store may enforce size (and/or other limitations) for the partial groupings generated for the query. Thus, as indicated at 740, a check or evaluation of the size of the hash table may be performed, in some embodiments. For example, the actual size or amount of memory consumed to store the hash table and groupings may be calculated. In another embodiment, a proxy or heuristic for the size of the hash table, such as a process size may evaluated. A flush limit may be a percentage based limitation (e.g., 50% of available or total storage capacity) or may be predefined value (e.g., 512 Megabytes). In some embodiments, the flush limit may change dynamically according to other resource needs in the data store. For example, a storage node in a multi-tenant storage service like that discussed above with regard to FIGS. 2-3 may increase or decrease the threshold according to a number of query processing sessions or slots exposed/made available on a storage node to different database volumes for different users than the database volume being processed. In another example, the flush limit if when initially exceeded the partial grouping results does not meet a minimum number or size (e.g., in order to make transfer of the results worthwhile).

As indicated by the positive exit from 740 if the flush limit is exceeded, the partial groupings identified according to the entries in the hash table may be sent to a query engine, in some embodiments. For example, separate partial result communications may be added to a clean-tuple stream (as discussed above with regard to FIG. 3) in order to return the different partial groupings. As indicated at 760, the hash table may be emptied. For instance, the partial groupings may be deleted after being sent (and/or acknowledged as received by the query engine) in order to reduce the size of the hash table below the flush limit. In some embodiments, all of the partial groupings may be sent in the event of the flush limit being exceeded. In other embodiments, replacement policies, such as Least Recently Used (LRU), may be implemented to send some, but not all, of the partial groupings in order to reduce the size of the hash table.

As indicated at 770, grouping of items may continue along with utilization of the hash table until no more items remain to group. The remaining partial grouping(s) identified according to the entries of the hash table may then be send to the query engine, as indicated at 780, in some embodiments. Note that similar techniques to those discussed above could be applied for other storage structures for partial results in other embodiments, such as hashing trees or sorted arrays.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 8:
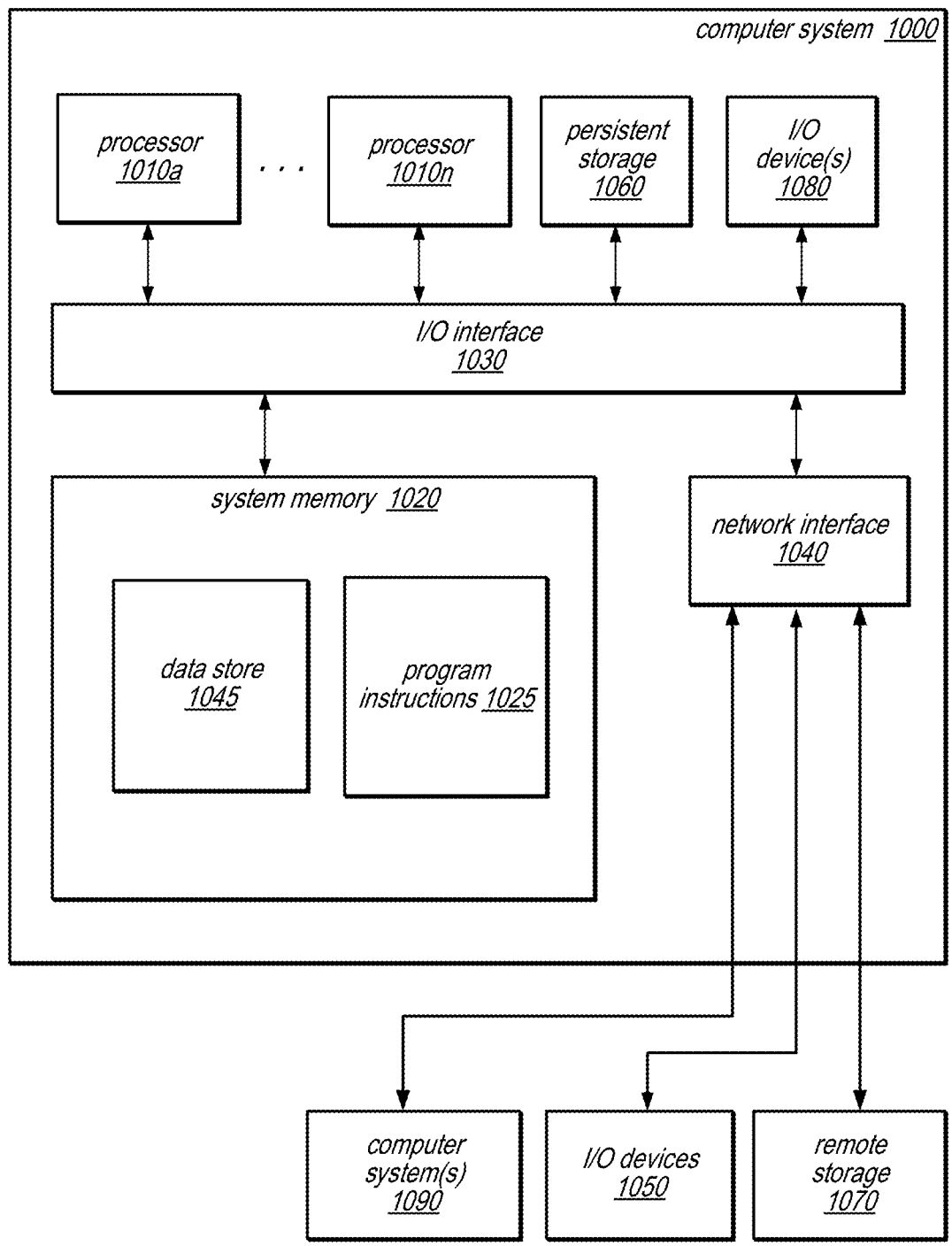
FIG. 8 is a block diagram illustrating a computer system that may implement at least a portion of systems described herein, according to some embodiments.

FIG. 8 is a block diagram illustrating a computer system that may implement at least a portion of the systems described herein, according to various embodiments. For example, computer system 1000 may implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 660, as desired, and may retrieve the stored instruction and/or data as needed. For example, in some embodiments, computer system 1000 may host a storage node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of storage nodes, respectively comprising at least one processor and a memory, wherein items of a database are stored across the plurality of storage nodes;
   another processor and another memory that implement a query engine for the database;
   the query engine, configured to:
   receive from a client a query, including an aggregation function, that is directed to the database;
   generate a plan to perform the query at the query engine;
   perform the query according to the plan, wherein to perform the query the query engine is configured to:
   receive a requested partial result of the aggregation function generated from a plurality of items of the database from one of the storage nodes, wherein the requested partial result of the aggregation function is performed at one or more of the storage nodes instead of at the query engine;
   receive a requested individual item from the one storage node or another one of the storage nodes;
   modify the individual item to be within a consistent view of the data set identified for the query;
   select alternative portions of the plan to apply to the partial result and modified individual item as part of performing the aggregation function; and
   return a result for the query to the database.

2. The system of claim 1, wherein to perform the query according to the plan, the query engine is configured to send requests to perform the aggregation function with respect to different items in the data set to different ones of the plurality of storage nodes.

3. The system of claim 1,
   wherein the query includes a grouping function in combination with the aggregation function and wherein the partial result is a partial grouping;
   wherein the one storage node is configured to:
   store the partial grouping according to an entry of a hash table; and
   send the partial grouping to the query engine responsive to a determination that a size of one or more partial groupings, including the partial grouping, exceeded a flush limit.

4. The system of claim 3, wherein the one storage node is further configured to modify the flush limit before determining that the size of the one or more partial groupings exceeded the flush limit for the hash table.

5. The system of claim 1, wherein the storage nodes are implemented as part of a log-structured storage service of a provider network, wherein the query engine is implemented as part of database service that provides access to the database, and wherein the query includes an indication to perform at least part of the query at the storage nodes of the log-structured storage service instead of at the query engine.

6. A method, comprising:
receiving from a client, at a query engine, a query, including an aggregation function, that is directed to a data set stored in a data store;
performing the query at the query engine, comprising:
receiving a requested partial result of the aggregation function generated from a plurality of items of the data set and performed at the data store instead of at the query engine;
receiving a requested individual item from the data set;
modifying the individual item to be within a consistent view of the data set identified for the query; and
selecting alternative portions of a query plan to apply to the partial result and modified individual item as part of performing the aggregation function.

7. The method of claim 6, wherein performing the query at the query engine further comprises sending requests to perform the aggregation function with respect to different items in the data set to different ones of a plurality of storage nodes that implement the data store.

8. The method of claim 7, wherein the individual item is received from a first storage node of the plurality of storage nodes and wherein the partial result is received from a second storage node of the plurality of storage nodes.

9. The method of claim 6, further comprising generating the query plan to perform the query at the query engine, wherein the query plan includes an operation that instructs the query engine to perform the selecting alternative portions of the query plan to apply to the partial result and modified individual item as part of performing the aggregation function.

10. The method of claim 6, wherein modifying the individual item to be within the consistent view of the data set identified for the query comprises applying one or more undo log records to the item to determine a different value for the item.

11. The method of claim 6, wherein the query further includes a grouping function to perform the aggregation function, wherein the partial result is partial grouping of the plurality of items performed at the data store.

12. The method of claim 11, further comprising:
storing, by the data store, the partial result according to a storage structure for partial results;
sending, by the data store, the partial result to the query engine responsive to a determination that a size of the storage structure exceeded a flush limit.

13. The method of claim 12, further comprising:
determining, by the data store, that current size of the hash table after sending the partial result still exceeds the flush limit for the hash table; and
sending, by the data store, another partial result stored in the hash table to the query engine.

14. The method of claim 12, wherein the flush limit for the storage structure is specific to the data set, wherein the data store stores one or more other data sets with other respective flush limits for the one or more other data sets.

15. The method of claim 11, further comprising performing a binary comparison of the plurality of items to determine which of the items are grouped together.

16. One or more non-transitory, computer-readable storage media, storing program instructions that when executed on or across one or more computing devices cause the one or more computing devices to implement:
receiving from a client, at a query engine, a query, including an aggregation function, that is directed to a data set stored in a data store;
generating a plan to perform the query at the query engine, wherein the plan comprises:
an operation that selects between alternative portions of the plan to perform the aggregation function according on whether input data to the operation is:
a partial result of the aggregation function generated from a plurality of items of the data set and performed at the data store instead of at the query engine; or
an individual item received at the query engine from the data set and modified by the query engine to be within a consistent view of the data set identified for the query; and
performing the plan at the query engine to return a result for the query.

17. The one or more non-transitory, computer-readable storage media of claim 16, wherein, in performing the plan at the query engine to return the result for the query, the program instructions cause the one or more computing devices to implement sending requests to perform the aggregation function with respect to different items in the data set to different ones of a plurality of storage nodes that implement the data store.

18. The one or more non-transitory, computer-readable storage media of claim 16, wherein the individual item and the partial result are received from a same storage node of the plurality of storage nodes.

19. The one or more non-transitory, computer-readable storage media of claim 16, wherein the query further includes a grouping function to perform the aggregation function, wherein the partial result is partial grouping of the plurality of items performed at the data store.

20. The one or more non-transitory, computer-readable storage media of claim 16, wherein the query engine is implemented as part of a database service of a provider network, wherein the data store is implemented as part of a storage service of the provider network, and wherein a request to enable query performance at the storage service for the query engine is received at the provider network.

* * * * *